(12) United States Patent
Boydstun et al.

(10) Patent No.: US 7,571,473 B1
(45) Date of Patent: Aug. 4, 2009

(54) IDENTITY MANAGEMENT SYSTEM AND METHOD

(75) Inventors: Kenneth C. Boydstun, Frisco, TX (US);
Stephen W Grimm, Summit, MO (US);
Steven R. Hentzen, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 826 days.

(21) Appl. No.: 11/149,923

(22) Filed: Jun. 10, 2005

(51) Int. Cl.
*G06F 17/30* (2006.01)
(52) U.S. Cl. .................... 726/21; 726/4; 726/3
(58) Field of Classification Search .............. 726/21, 726/4, 3
See application file for complete search history.

(56) References Cited

U.S. PATENT DOCUMENTS

| | | | |
|---|---|---|---|
| 6,088,679 | A | 7/2000 | Barkley |
| 6,128,012 | A | 10/2000 | Seidensticker, Jr. et al. |
| 6,640,307 | B2 | 10/2003 | Viets et al. |
| 6,826,725 | B1 | 11/2004 | Beezer et al. |
| 7,185,364 | B2 | 2/2007 | Knouse et al. |
| 7,194,253 | B2 | 3/2007 | Ritter et al. |
| 7,200,563 | B1 | 4/2007 | Hammitt et al. |
| 7,225,400 | B2 | 5/2007 | Beezer et al. |
| 7,334,254 | B1 | 2/2008 | Boydstun et al. |
| 7,343,625 | B1 | 3/2008 | Zaidi et al. |
| 7,392,546 | B2 | 6/2008 | Patrick |

OTHER PUBLICATIONS

WIndows (white paper on Identity and Access Management, Jul. 2003); year 2003.*

Siteminder, see Service Description: CA Siteminder Web Access Manager Solution Implementation, Ensuring a Comprehensive Web Access Solution That Delivers Rapid Results, printed out in year 2008.*

Modular reference framework architecture for Identity Management Dabrowski, M.; Pacyna, P.; Communication Systems, 2008. ICCS 2008. 11th IEEE Singapore International Conference on Nov. 19-21, 2008 pp. 743-749.*

Supports for Identity Management in Ambient Environments—The Hydra Approach Akram, H.; Hoffmann, M.; Systems and Networks Communications, 2008. ICSNC '08. 3rd International Conference on Oct. 26-31, 2008 pp. 371-377.*

Trade-off Analysis of Identity Management Systems with an Untrusted Identity Provider Elahi, G.; Lieber, Z.; Yu, E.; Computer Software and Applications, 2008. COMPSAC '08 32nd Annual IEEE International Jul. 28, 2008-Aug. 1, 2008 pp. 661-666.*

(Continued)

*Primary Examiner*—David Y Jung

(57) ABSTRACT

A system is for identity management is provided. The system includes an identity management data store, a human resources input, an application registration component, and a security component. The identity management data store stores identity-related information for a user of an application. The identity-related information is mapped within the identity management data store to role information for the user of the application. The human resources input provisions the identity management data store with the identity-related information. The application registration component facilitates the application to provision the identity management data store with the role information for the user of the application. The security component authenticates the user and authorizes the user for access to the application based on the identity-related information. The security component retrieves the role information mapped to the identity-related information and delivers the role information to the application.

20 Claims, 3 Drawing Sheets

OTHER PUBLICATIONS

Citrix Systems, Citrix MetaFrame Password Manager, Apr. 22, 2004, (1 pg.).

Boydstun, Ken, Security Framework Bridge, Filing Date—Oct. 31, 2002, U.S. Appl. No. 10/284,680, Specification (45 pgs.), Drawings (3 sheets).

Boydstun, Kenneth C., et al., Business-To-Business Security Integration, Filing Date—Jul. 31, 2003, U.S. Appl. No. 10/631,984, Specification (29 pgs.), Drawings (3 sheets).

Balasubramanian, Balagurunathan, et al., Call Center Dashboard, Filing Date—Oct. 7, 2004, U.S. Appl. No. 10/960,535, Specification (42 pages), Drawings (13 sheets).

Himawan, Rudi, et al., Single Sign-On System and Method, Filing Date—Nov. 22, 2004, U.S. Appl. No. 10/994,997, Specification (33 pgs.), Drawings (3 sheets).

Office Action—Restriction Requirement dated Sep. 12, 2007, 6 pages, U.S. Appl. No. 10/794,658, filed Mar. 5, 4004.

Office Action dated Dec. 7, 2007, 12 pages, U.S. Appl. No. 10/794,658, filed Mar. 5, 2004.

Final Office Action dated Jul. 8, 2008, 13 pages, U.S. Appl. No. 10/794,658, filed Mar. 5, 2004.

Advisory Action dated Sep. 23, 2008, 5 pages, U.S. Appl. No. 10/794,658, filed Mar. 5, 2004.

Notice of Allowance and Fee(s) Due dated Dec. 30, 2008, 9 pages, U.S. Appl. No. 10/794,658, filed Mar. 5, 2004.

* cited by examiner

IDENTITY MANAGEMENT SYSTEM AND METHOD

CROSS-REFERENCE TO RELATED APPLICATIONS

This application contains subject-matter related to U.S. patent application Ser. No. 10/994,997, entitled "Single Sign-on System and Method", filed on Nov. 22, 2004, inventors Rudi Himawan, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of the identities of users of computing applications. More particularly, embodiments of the present invention provide a single authoritative source for the identities of the users and for the roles the users hold in the applications.

BACKGROUND OF THE INVENTION

An enterprise might have multiple web-based applications that can be accessed only by authorized users. For authentication and authorization purposes, the users might be required to sign in to the applications or to a security system controlling access to the applications. That is, when attempting to access an application, a user typically provides a user ID (identification) and a password to the application. The application might then authenticate the identity of the user by confirming that the password is correct for the user ID. After authentication, an authorization process might determine whether the user is allowed to have access to the requested application.

Authentication and authorization information for the users is typically stored in a data store such as a relational database or a directory such as a directory compliant with the Lightweight Directory Access Protocol. For example, an authentication data store might maintain a list of user IDs and corresponding passwords. When a user attempts to sign on to an application, the password provided by the user is checked against the password stored in the authentication data store for the user's user ID. If the password and user ID combinations match, the identity of the user is confirmed.

An authorization data store might maintain the users entitlements within an application to which a user is allowed access. The application to which the user has proper access relies upon authorization data to determine what functions the user is allowed to perform. The authentication data store and the authorization data store might be separate or might be combined into a single data store.

In some cases, an application might perform its own authentication and authorization activities by interacting directly with its own internal authentication and authorization data stores. In other cases, a policy server or other intermediary component might act as an authentication broker on behalf of the application. In such a case, the intermediary would not itself be responsible for directly authenticating a user attempting access to an application. Instead, it would only be capable of receiving the user ID and password combination submitted by the user and directs the access request to a separate authentication and/or authorization data store for actual evaluation of the credentials. The data store would perform the authentication of the user and send the results of the credential test back to the intermediary which, in turn, will forward to the application to either allow or deny user access. The benefits of an intermediary is that it is capable of interacting with multiple types of authentication and/or authorization data store technologies, leaving the application itself insulated from the actual task of authentication. An intermediary is also capable of allowing multiple applications to share the same user ID and password combination. This provides the user of the applications a quicker, more pleasant computing experience.

In addition to the authentication and authorization data stores, an enterprise might have multiple systems that maintain the digital identities of employees and other individuals within or associated with the enterprise. A person's digital identity is considered to be any electronic information that is associated with that person for the general purpose of identifying them to a system or service. Systems that are responsible for collecting and maintaining the integrity of a person's common digital information and the resources they use for the benefit of an entire enterprise are called Identity Management systems. Common identity attributes stored in an enterprise Identity Management System are name, phone number, email address, job title, manager's name, user ID(s), password(s) and other information that is commonly in demand by the enterprise systems. For example, there might be separate identity management systems for network sign-on, mainframe sign-on, application sign-on, access badge-related security, and other areas where unique user identities are needed. These identity management systems might use different naming standards and other protocols for managing user IDs, passwords, and other identity-related attributes. Since each identity management system might have its own data store to hold identity information, maintenance of multiple identity management systems and data stores can be complex, contradicting, cumbersome, and error prone.

SUMMARY OF THE INVENTION

An embodiment of the invention is a system for identity management. The system includes an identity management data store, a component, which may also be referred to as a human resources input, is operable for accepting and aggregating multiple authoritative identity sources of information into a single digital identity for each person or human resource. The system further includes an application registration component, and a security component. The component for accepting and aggregating the authoritative identity source is operable for initially declaring the existence of an identity to the business. In most organizations, a human resources department is responsible for declaring employees and providing basic identity information that the rest of the business needs. Other sources for identities such as contractors or other associates may also be engaged. An authoritative identity source is typically considered to have applied a high level of validation of an identity's existence before passing the information to the rest of the enterprise. The identity management data store stores identity-related information for a user of an application. Business logic is associated with the identity management data store so that a person or identity is recorded only once. The identity-related information is mapped within the identity management data store to role information for the user of the application. The component for aggregating the authoritative identity sources provisions the identity management data store with the identity-related information. The application registration component allows an application or application owner to associate a user that has been provisioned in the identity management data store with that application and also provide role information for that user of the application. The security component authenticates the user and authorizes the user for access to the application based on the application's required identity-related information. The security component retrieves the role information mapped to the identity-related information and delivers the role information to the application.

An alternative embodiment is a method for providing a user access to an application. The method includes registering role-related information, via an application registration component, by the application. The method includes storing the role-related information in an identity management data store. The method provides for provisioning the identity management data store with identity-related information for the user from a authoritative identity source, such as a human resources system. The method includes mapping in the identity management data store the identity-related information to the role-related information. The method includes authenticating the user, and consulting the identity management data store to determine if the user is authorized to access the application. The method further provides for the user attempting to access the application, and the application or an intermediary, then retrieving the role-related information from the identity management data store based on the mapping to the users' identity-related information. The method includes the identity management data store or an intermediary to provide the role-related information related to the application for which the user attempts to access. The application associates the role-related information with its own internal rules which may dictate which functions the user is allowed to perform. The method also includes the application using the rules associated with role-related information of the user to determine the user's access to the application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
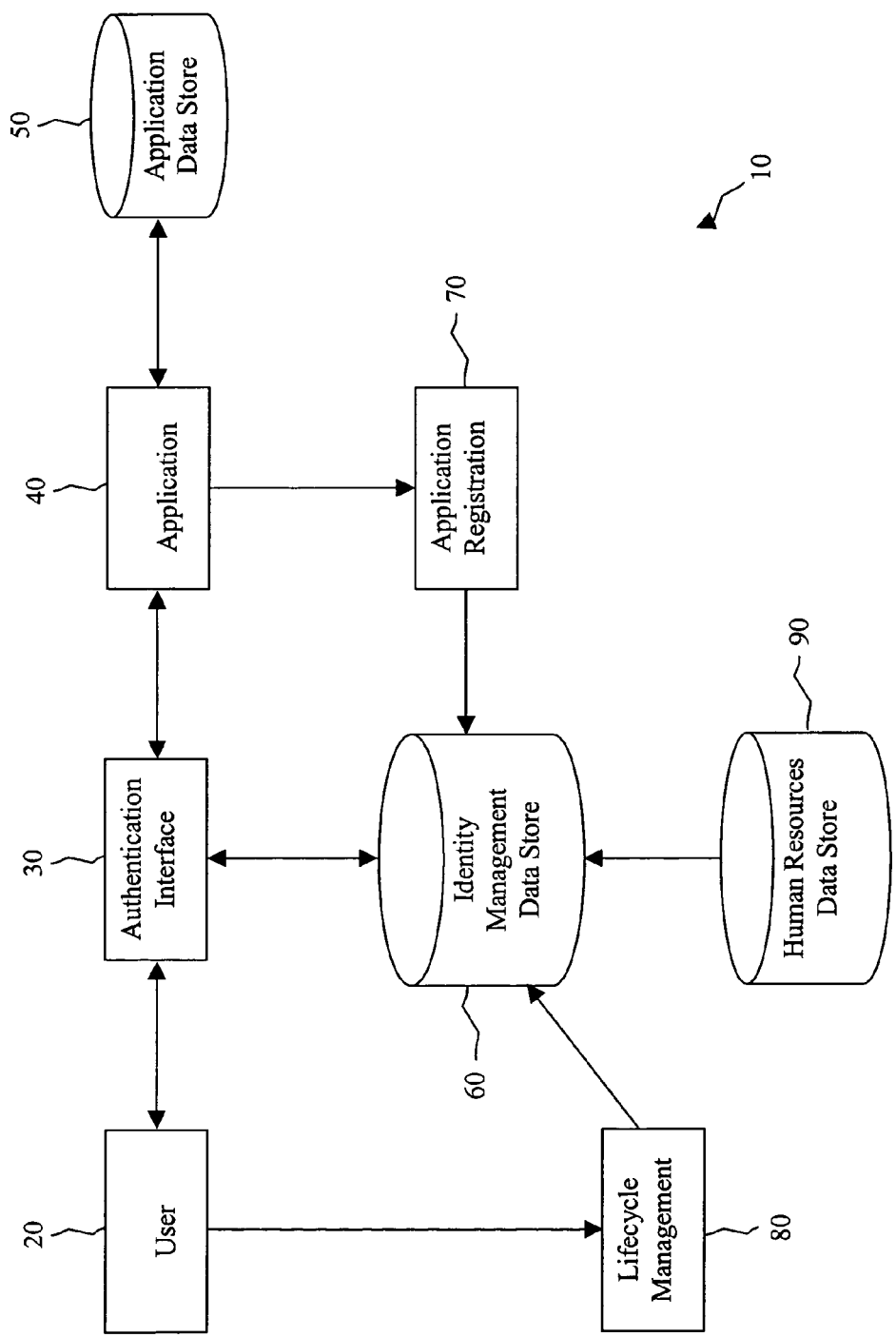
FIG. 1 is a block diagram of an identity management system according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Different users of an application might have different levels of authority in the application. That is, a first user might be allowed to perform a particular action in a particular application but a second user might not be allowed to perform the same action in that application. The set of actions that a user is authorized to perform within a particular application or the set of responsibilities a user holds within a particular application can be referred to as a role.

It is typically desirable that authorization for access to secure applications be based on roles that are not tied to the proper values. Job title, for example, may not be a proper determination of a user's role in an application since two employees with the same job title might require different permissions within a particular application, such as a credit analyst and credit manager. Authorization for access to such an application needs to be appropriately role-based to ensure that the proper level of authority is given to each user.

A large enterprise might have hundreds of computers and thousands of applications and users. In previous implementations, each secure application within such an enterprise typically has its own data store for authentication and authorization data. The data store might maintain records of the users who are allowed access to the application, the roles those users are allowed to hold in the application, and the functions those roles are allowed to perform. That is, there might be a mapping of users to roles and roles to functions within the data store of each application. When an authorized user signs in to the application, the data store can specify which functions the user can perform in that application based on which roles the user holds in that application.

In various current embodiments, a single identity management data store holds identity-related and role-related information for multiple applications. The mapping of users to the roles they can hold in various applications occurs in this single identity management data store. The applications merely need to map the roles to functions and do not need to deal with authenticating and authorizing users for roles. When a user attempts to gain access to an application, role-related authentication and authorization information is retrieved from the single identity management data store. The identity management data store then informs the application of the roles the user can hold in the application and the application allows the user to perform the functions corresponding to those roles.

The use of the single identity management data store can facilitate the implementation of a single sign-on feature for multiple applications. With single sign-on, a user can sign on to one secure application and thereafter be automatically signed on to all other secure applications to which the user has access. Authentication and authorization information is automatically retrieved when the user switches from one application to another and no further action from the user is needed. In one embodiment, the authentication and authorization system accomplishes this by assigning a session credential, such as a cookie in a browser, to the user once the user is authenticated. Thereafter, when the user attempts to access other applications, the new application accesses the credential to determine whether the user has a valid session and is authorized to access the application. The session credential may include information identifying to the first, second, or subsequent applications that the user has already logged into the system, may include a listing of applications and authorization rights within each application, and other information which may be useful. The session credential, such as the cookie, may only be valid for a particular time, such as a particular date and time-frame, and may be encrypted or otherwise secured.

Single sign-on is difficult to implement when each application has its own authentication and authorization data store because every time a user switches applications, a different data store must be searched for the appropriate authentication and authorization information. When the authentication and authorization information for multiple applications is stored in the single identity management data store, only a single data store needs to be searched when a user switches from one application to another.

In various embodiments, a centralized location is provided where applications can register the roles that can perform functions within the applications. This application registration component can store in the single identity management data store the roles that can be held in the applications. The identity management data store can also contain identity-related information (user name, user ID, social security number, etc.) that might be received from a human resources data store, for example. The identity-related information can be mapped in the identity management data store to the role-related data received from the applications.

In various embodiments, when a user uses a web browser to attempt to reach a web-based application, an authentication and authorization component consults the identity management data store and confirms that the user's ID and password are correct and that the user is authorized to access the application. The authentication and authorization component then retrieves the user's roles from the identity management data store, tells the application that the user has been authenticated and authorized, and informs the application which roles the user can hold in the application. In previous systems, an identity management system might simply allow access to the application. The application would then determine the user's roles and control what the user could or could not do within the application.

Upon reaching an application, a user might be presented with customized graphical user interface displays based on the user's roles. That is, the buttons, menu items, and other display elements that appear on the graphical user interface might be different for each role in each application.

A generic role might be provided by default to all authorized users to let the users have a minimal level of access to all applications. For example, a new employee might automatically be given authority to perform basic tasks in all applications but might not be allowed to perform more advanced tasks until an administrator assigns the employee specific roles in specific applications. Alternatively, a new employee might automatically be assigned certain roles and certain minimal role-related responsibilities based on the employee's job title. An administrator might then manually expand the employee's capabilities in the assigned roles.

FIG. 1 illustrates an embodiment of a system 10 that uses a single identity management data store 60. When a user 20 attempts to gain access to an application 40, an authentication interface 30 acts as an authentication and authorization gateway to ensure that the user 20 is permitted to use the application 40. While only one user 20 and one application 40 are shown, in other embodiments other numbers of users and applications could be present. In an embodiment, the authentication interface 30 might be part of the Netegrity, Inc., SiteMinder authentication software package or a similar security management system.

The authentication interface 30 compares the user ID and password entered by the user 20 with the password for that user ID stored in the identity management data store 60. If the passwords match, the user 20 is authenticated. In other embodiments, information other than passwords and user IDs may be used, such as tokens, cookies, or other information. The authentication interface 30 then consults the identity management data store 60 to determine if the user 20 is authorized to access the requested application 40. If the user 20 is authorized, a user-to-role map within the identity management data store 60 is consulted to determine the roles the user 20 can hold within the requested application 40. A list of roles the user 20 can hold is then returned to the application 40 and the application 40 maps these roles to specific functions within the application 40.

A human resources data store 90 is the origination point for information on users 20 of the applications 40. The human resources data store 90 sends authoritative identification information to the identity management data store 60. The identity-related information can be pulled from the human resource data store 90 by the identity management data store 60, pushed by the human resource data store 90 to the identity management data store 60, or moved from the human resource data store 90 to the identity management data store 60 in some other manner. In this way, the identity management data store 60 can be provisioned with network IDs, application IDs, mainframe IDs, other IDs, and their corresponding passwords for the users 20 of the applications 40. Some or all of the network IDs, application IDs, mainframe IDs, other IDs may be in the human resource data store 90 or may be in maintained in other data stores as well. The identity management data store 60 then becomes an authoritative source for identity information about the users 20 of the applications 40.

In previous systems, each application typically had its own data store to hold authentication and authorization data as well as other information needed for the normal operation of the application. In the current embodiments, the authentication and authorization information for multiple applications 40 is placed in the identity management data store 60. Each application 40 might still have its own data store 50 for normal operating data and for mapping roles to functions, but the application data store 50 no longer needs to deal with authentication and authorization information. The authentication interface 30 can point to the identity management data store 60 for authentication and authorization information rather than to the application data store 50.

The identity management data store 60 maps users 20 to the roles the users 20 can hold. When the authentication interface 30 authenticates and authorizes a user 20 for an application 40, the authentication interface 30 can provide the application 40 with a list of roles the user 20 can hold in the application 40. The application 40 can then consult its own data store 50 to determine what actions each role is allowed to take and lets the user 20 take actions based on the user's role. For example, the application data store 50 might inform the application 40 that a particular role is allowed to adjust a customer's bill.

An application registration component 70 allows the roles that can be held within the applications 40 to be recorded in the identity management data store 60. In one embodiment, a utility script or software routine within or associated with an application 40 might automatically send the application registration component 70 a list of roles within the application 40 that have been modified or newly created. In another embodiment, an administrator might use a graphical user interface to enter the roles that are associated with each application 40 into the application registration component 70. Other methods for registering all the enterprise's applications 40 and each application's roles into the application registration component 70 will be apparent to one of skill in the art. After the roles have been registered, the application registration component 70 can store the registered roles in the identity management data store 60.

Having the identity management data store 60 as the central repository for authentication, authorization, and role-related information can simplify the provisioning and modification of such data. When a new user 20 is given access to one or more applications 40, identity-related information for the user 20 can be stored in the identity management data store 60 and mapped to the roles the user 20 can hold in those applications 40. For example, a supervisor or security administrator might enter into the identity management data store 60 a list of roles the new user 20 can hold in the applications 40 to which the user 20 is being given access. This eliminates the need to individually provision identity-related and role-related information into the application data store 50 of each application 40 to which the user 20 is being given access.

Similarly, when identity-related or role-related information for an existing user 20 is to be modified or deleted, the appropriate changes can be made once in the identity management data store 60 rather than multiple times in multiple application data stores 50. Such one-time modifications might be done automatically whenever a new employee is hired or an existing employee is terminated. This eliminates the need for an administrator to manually enter or delete information in multiple locations. For example, all authentication and authorization information for a terminated employee can be deleted simply by removing the employee's records from the identity management data store 60, as opposed to removing the records from multiple application data stores 50. In some embodiments, the human resource or other systems may trigger a process to perform this removal automatically.

Ownership of identity, role, and responsibility information in the identity management data store 60 might be retained by different entities. A human resources department might own Social Security number and user ID information, a unit manager or business manager might own role and responsibility information, and an employee might own personal information such as first and last name. A user lifecycle management component 80 might identify ownership of each piece of data in the identity management data store 60 and might allow users 20 to self-manage the data that they own. For example, a user whose last name changes due to marriage might be allowed to make the appropriate name change in the identity management data store 60 by means of the lifecycle management component 80. The change might then propagate to other systems that use the last name. Similar procedures could be used for the changing of passwords or other user-modifiable elements in the identity management data store 60.

An application 40 might display different graphical user interfaces (GUIs) to different users 20 based on the roles the users 20 hold in the application 40. For example, a GUI might display a set of buttons, each of which performs a different action when selected by a mouse. For a user 20 with a role that allows the user 20 to perform all of the actions corresponding to the buttons, all of the buttons might be active. For a user 20 with a role that does not allow the user 20 to perform certain actions within the application 40, the buttons corresponding to the disallowed actions might be inactivated. One of skill in the art will recognize other ways in which a GUI could be customized based on the roles a user 20 holds.

Figure 2:
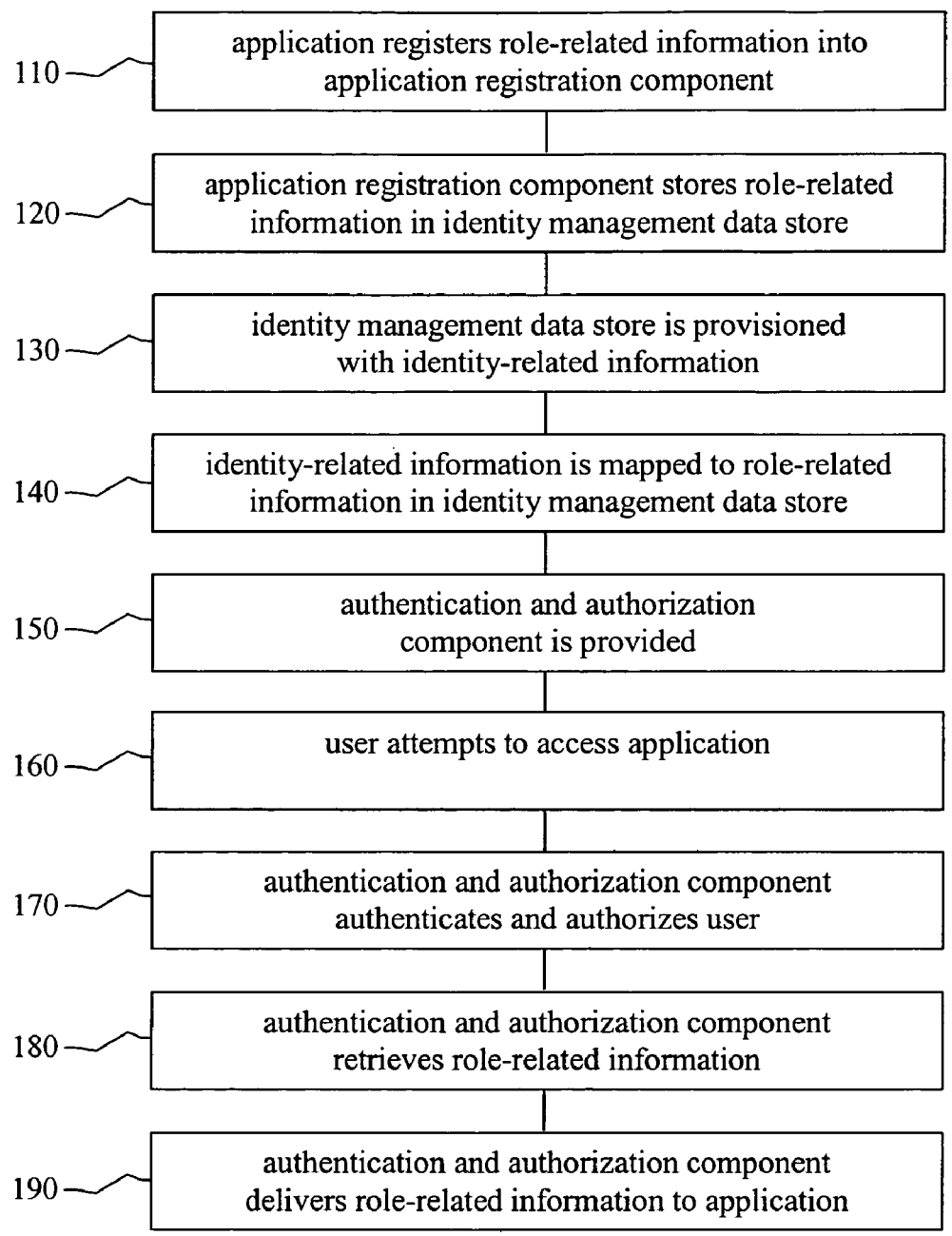
FIG. 2 is a flowchart of a method for managing identities according to one embodiment of the present disclosure.

FIG. 2 illustrates a method for managing user identities and roles by means of a single identity management data store. In box 110, an application registers role-related information into an application registration component. In box 120, the application registration component stores the role-related information in an identity management data store. In box 130, the identity management data store is provisioned with identity-related information. The identity-related information would typically come from an authoritative human resources data store. Within the identity management data store, the identity-related information is mapped to the role-related information in box 140.

In box 150, an authentication and authorization component is provided. The authentication and authorization component is capable of receiving information (such as a user ID and password) from a user and authenticating and authorizing the user. A user attempts to access an application in box 160.

In box 170, the authentication and authorization component compares the information provided by the user with the identity-related information in the identity management data store to authenticate and authorize the user. In the present embodiment, in box 180, this includes authenticating the user's information with that stored in the identity management data store. The authentication and authorization component then retrieves the user's role-related information from the identity management data store. In box 190, the authentication and authorization component delivers the role-related information to the application. The application then authorizes the user, which may include mapping the role-related information to an action that can be taken by the user. In other embodiments, the process may first authorize the user with regard to specific application and then authenticate the user's role-related information.

One of skill in the art will recognize that the actions in the method described above do not necessarily need to occur in the order presented. For example, the provisioning of the identity management data store with identity-related information could occur before the provisioning of the identity management data store with role-related information.

Figure 3:
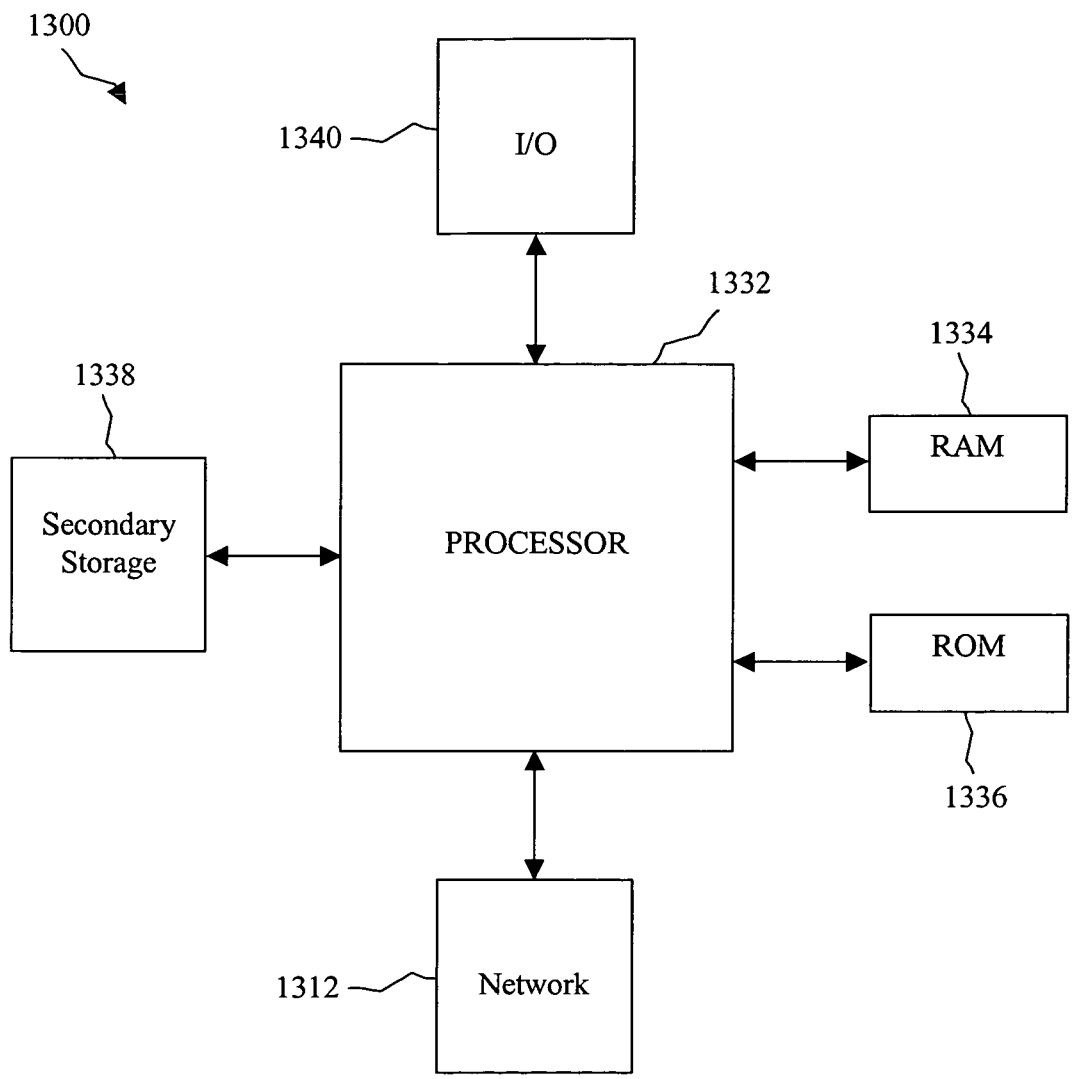
FIG. 3 is a block diagram of a computer system operable for some of the various embodiments of the present disclosure.

A data structure for an identity management system as described above may generally be implemented on a variety of different computer systems. FIG. 3 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the Identity Management System and Method may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A system for identity management comprising:
    an identity management data store configured to store identity-related information for a user of an application, the identity-related information mapped within the identity management data store to role information for the user of the application;
    a human resources input configured to provision the identity management data store with the identity-related information;
    an application registration component stored as a set of computer readable instructions on a computer readable medium and executable by a processor to facilitate the application to provision the identity management data store with the role information for the user of the application; and
    a security component stored as a set of computer readable instructions on a computer readable medium and executable by a processor to authenticate the user and authorize the user for access to the application based on the identity-related information, the security component further configured to retrieve the role information mapped to the identity-related information and deliver the role information to the application.

2. The system of claim 1, further comprising an application data store coupled to the application, the application data store containing no identity-related information.

3. The system of claim 1, further comprising an application data store coupled to the application, the application data store maintaining rule information related to access to the application by users, the application associating the role information with the rule information to determine the user's access to the application.

4. The system of claim 1, further comprising a lifecycle management component configured to allow the user to modify a portion of the identity-related information in the identity management data store.

5. The system of claim 4, further comprising a graphical user interface displayed by the application and customized for the user based on the user's role-related information.

6. The system of claim 1, further comprising a default roles component configured to provision the identity management data store with a set of default roles for associated with one or more applications for a specific user.

7. The system of claim 1, wherein the security component is further defined as Siteminder.

8. The system of claim 7, wherein Siteminder maintains an authorization and authentication data store to authenticate users.

9. The system of claim 8, wherein the authentication data store maintains user name and passwords.

10. The system of claim 8, wherein the authorization data store identifies at least some areas of an enterprise system that the users are authorized to access.

11. The system of claim 10, wherein the areas of the enterprise system are further defined as Universal Resources Locator.

12. A method for providing a user access to an application comprising:
    registering role-related information via an application registration component stored as a set of computer readable instructions on a computer readable media and executed by a processor, by the application, wherein the application is stored as a set of computer readable instructions on a computer readable media that are executed by a processor;
    storing the role-related information in an identity management data store;
    provisioning the identity management data store with identity-related information for the user from a human resources system;
    mapping in the identity management data store the identity-related information to the role-related information;
    authenticating the user by an authentication interface, wherein the authentication interface is stored on a computer readable media and executed by a processor;
    consulting, using the authentication interface, the identity management data store to determine if the user is authorized to access the application;

the user attempting to access the application through the authentication interface;

retrieving with the authentication interface the role-related information from the identity management data store based on the mapping to the users' identity-related information;

providing the role-related information related to the application for which the user attempts to access;

the application associating the role-related information with rules related to access to the application by users; and the application using the rules associated with role-related information of the user to determine the user's access to the application.

13. The method of claim 12, further comprising a security component operable to maintain user authentication information.

14. The method of claim 13, wherein the security component is further defined as Siteminder.

15. The method of claim 14, wherein Siteminder maintains an authorization and authentication data store to authenticate users.

16. The method of claim 15, wherein the authentication data store maintains user name and passwords.

17. The method of claim 15, wherein the authorization data store identifies at least some areas of an enterprise system that the users are authorized to access.

18. The method of claim 17, wherein the areas of the enterprise system are further defined as Universal Resources Locator.

19. The method of claim 12, wherein the application maintains a separate data store that maintains at least some of the role-related information and rule related information and does not maintain the identity-related information.

20. The method of claim 12, further comprising:

selecting a default role for a specific user; and propagating the default role to a plurality of the role-related information maintained in the identity management data store related to the specific user.

* * * * *